US011323000B2

(12) United States Patent
Lin et al.

(10) Patent No.: US 11,323,000 B2
(45) Date of Patent: May 3, 2022

(54) MOTOR, STATOR MODULE AND COIL WINDING METHOD THEREOF

(71) Applicant: BYD COMPANY LIMITED, Shenzhen (CN)

(72) Inventors: Huanwei Lin, Shenzhen (CN); Bin You, Shenzhen (CN); Wenming Qi, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 262 days.

(21) Appl. No.: 16/652,342

(22) PCT Filed: Sep. 29, 2018

(86) PCT No.: PCT/CN2018/108687
§ 371 (c)(1),
(2) Date: Mar. 30, 2020

(87) PCT Pub. No.: WO2019/062929
PCT Pub. Date: Apr. 4, 2019

(65) Prior Publication Data
US 2020/0235623 A1    Jul. 23, 2020

(30) Foreign Application Priority Data
Sep. 29, 2017    (CN) .......................... 201710910246.6

(51) Int. Cl.
*H02K 15/00* (2006.01)
*H02K 3/12* (2006.01)
(Continued)

(52) U.S. Cl.
CPC ................ *H02K 3/12* (2013.01); *H02K 3/28* (2013.01); *H02K 15/0068* (2013.01);
(Continued)

(58) Field of Classification Search
CPC .... H02K 3/12; H02K 15/0414; H02K 15/085; H02K 15/0056; H02K 2203/06;
(Continued)

(56) References Cited

U.S. PATENT DOCUMENTS 9,479,021 B2 * 10/2016 Tamura .................... H02K 3/28
10,044,236 B2 * 8/2018 Tamura .................... H02K 3/30

FOREIGN PATENT DOCUMENTS

| CN | 102647033 A | 8/2012 |
| CN | 102656775 A | 9/2012 |

(Continued)

OTHER PUBLICATIONS

The World Intellectual Property Organization (WIPO) International Search Report for PCT/CN2018/108687 dated Dec. 7, 2018 6 Pages.

*Primary Examiner* — Thiem D Phan
(74) *Attorney, Agent, or Firm* — Anova Law Group, PLLC (57) ABSTRACT

A winding method for a stator module applicable to a motor having z slots, 2p poles, and m phases. The stator module includes a stator core and a winding coil. The winding coil is made of a flat wire. The winding method includes: forwardly winding some stator slots by means of the arrangement and connection of multiple U-shaped conductor sections, and then reversely winding the stator slots; afterwards, forwardly winding the remaining stator slots, and then reversely winding the stator slots; and cycling in this way.

14 Claims, 5 Drawing Sheets

(51) Int. Cl.
　　　*H02K 3/28*　　　　(2006.01)
　　　*H02K 15/06*　　　(2006.01)
　　　*H02K 15/085*　　(2006.01)

(52) U.S. Cl.
　　　CPC ......... *H02K 15/064* (2013.01); *H02K 15/085* (2013.01); *Y10T 29/49009* (2015.01)

(58) Field of Classification Search
　　　CPC ......... Y10T 29/49009; Y10T 29/49073; Y10T 29/49071
　　　USPC .......................... 29/596, 605, 606, 729, 732
　　　See application file for complete search history.

(56) References Cited

FOREIGN PATENT DOCUMENTS

| | | |
|---|---|---|
| CN | 204334135 U | 5/2015 |
| CN | 106787290 A | 5/2017 |
| JP | 2016032392 A | 3/2016 |

\* cited by examiner

MOTOR, STATOR MODULE AND COIL WINDING METHOD THEREOF

CROSS-REFERENCE TO RELATED APPLICATIONS

This application is a national phase entry under 35 U.S.C. § 371 of International Application No. PCT/CN2018/108687, filed on Sep. 29, 2018, which claims priority to and benefits of Chinese Patent Application No. 201710910246.6, filed on Sep. 29, 2017. The entire content of all of the above-referenced applications is incorporated herein by reference.

FIELD

The disclosure relates to the field of motors and, more particularly, to a drive motor applicable to a vehicle, a stator module, and a coil winding method for winding the stator module.

BACKGROUND

In terms of armature connection and implementation modes in the related art, from the perspective of a manufacturing process, there are many types of flat wire armatures to be manufactured, and both ends in an axial direction need to be welded, which results in many welding spots. In addition, in the foregoing wave winding mode, it is difficult to accurately fix a flat wire after paying-off, the production cost is high, and the manufacturing process is very difficult. From the perspective of electrical connection, the foregoing winding form in the related art is adopted. A voltage difference between different layers of stator windings in the same slot is high, and it is easy to break down layers in different layers of stator windings under high voltage conditions to result in a short circuit, which will cause a motor to fail.

SUMMARY

The disclosure aims to solve at least one of the technical problems existing in the related art. For this reason, the disclosure proposes a winding method for a stator module. A manufacturing process of the winding method is simple, and the electrical connection is safe and reliable.

According to an embodiment of a first aspect of the disclosure, a coil winding method for a stator module is provided. The stator module is applicable to a motor having z slots, 2p poles, and m phases. The number of slots per pole and phase is $q=z/m/(2p)$. The number of parallel branches is a, where $a \leq q$. The stator module includes a stator core having multiple stator slots. Each of the stator slots has multiple slot layers.

The coil winding method includes the following steps:

S1: providing multiple U-shaped conductor sections, each of the U-shaped conductor sections including a bent portion and a first in-slot portion and a second in-slot portion respectively connected to the bent portion, and pitches between the first in-slot portion and the second in-slot portion being all y stator slots, where y is an integer and $y=z/2p$;

S2: enabling the first in-slot portion of the U-shaped conductor section to pass through one of the slot layers in one of the stator slots and the second in-slot portion to pass through one of the slot layers in another stator slot, end portions of the first in-slot portion and the second in-slot portion extending beyond the stator core to form a welding end after the first in-slot portion and the second in-slot portion pass through the stator slots;

S3: welding and connecting the first in-slot portion and the second in-slot portion in different layers of the multiple U-shaped conductor sections to the welding end, such that a winding direction of the winding is configured in each phase and each way:

S31: leading out a lead-out wire to a radially outermost slot layer of an initial slot;

S32: spanning y stator slots on the same layer along a first direction;

S33: spanning along a second direction by starting from a radially second outermost slot layer that spans the y stator slots, the number of layers of the slot layer changing by one every time the y stator slots are spanned, the number of layers changing radially from outside to inside till a radially second innermost slot layer;

S34: spanning y stator slots on the same layer along the first direction by starting from a radially innermost slot layer that spans the y stator slots;

S35: spanning along the first direction by starting from the radially second innermost slot layer that spans the y stator slots, the number of layers of the slot layer changing by one every time the y stator slots are spanned, the number of layers changing radially from inside to outside till the radially second outermost slot layer;

S36: spanning y stator slots on the same layer along the first direction by starting from the radially outermost slot layer that spans the y stator slots; and S37: repeating S33-S36 until the winding reaches an adjacent layer of the radially outermost slot layer of a termination slot and then a star point wire of this phase and this way is led out, the termination slot being spaced from the initial slot by y stator slots in a forward direction.

The first direction and the second direction are opposite directions along the circumference of the stator core.

According to some embodiments of the disclosure, the number of layers of the slot layer in each of the stator slots is an even number.

According to some embodiments of the disclosure, lead-out wires of the same phase and respective ways differ by one stator slot between two adjacent phases in a circumferential direction.

According to some embodiments of the disclosure, star-point wires of respective phases and each way differ by 2q slots between two adjacent phases in the circumferential direction, and lead-out wires of respective phases and each way differ by 2q slots between two adjacent phases in the circumferential direction.

According to some embodiments of the disclosure, the U-shaped conductor section at least includes: multiple first U-shaped conductor sections, the first U-shaped conductor sections being used for spanning on the same layer in step S32; multiple second U-shaped conductor sections, the second U-shaped conductor sections being used for spanning inwards radially by one layer from a radial outer layer when spanning in a second winding direction in step S33; multiple third U-shaped conductor sections, the third U-shaped conductor sections being used for spanning outwards radially by one layer from a radial inner layer when spanning in a first winding direction in step S35; and multiple fourth U-shaped conductor sections, the fourth U-shaped conductor sections being used for spanning on the same layer in step S34.

According to some embodiments of the disclosure, a connecting leg and a welding leg are connected to an end of any one of the first in-slot portion and the second in-slot portion of the U-shaped conductor section respectively. The connecting leg is bent with respect to the corresponding in-slot portion.

According to some embodiments of the disclosure, the connecting legs of the first in-slot portion and the second in-slot portion in the first U-shaped conductor section are bent in the same direction, the connecting legs of the first in-slot portion and the second in-slot portion in the fourth U-shaped conductor section are bent in the same direction, and the connecting legs of the first U-shaped conductor section and the fourth U-shaped conductor section are bent in opposite directions.

According to some embodiments of the disclosure, the connecting legs of the first in-slot portion and the second in-slot portion of the second U-shaped conductor section are bent in opposite directions, and the second U-shaped conductor section and the third U-shaped conductor section are of the same shape.

According to some embodiments of the disclosure, the stator module is applicable to the motor having a slot number z of 48, a pole pair number p of 4, a phase number of 3, and a pitch y of 6.

According to some embodiments of the disclosure, each of the 48 stator slots has six slot layers a, b, c, d, e, and f, three phases include a U phase, a V phase and a W phase, and the number a of ways per phase is 2. A winding route of a first way of the U phase of a stator is as follows:

1f→43f→e→7d→13c→19b→25a→19a→13b→7c→d→43b e→37f→31f→37e→43d→1c→7b→13a→7a→1b→43c→37d→31 e→25f→19f→→25e→31d→37c→43b→1a→43a→37b→31 c→25d→19e→13f→7f→13e→19d→25c→31b→37a→31a→25b→19c→13d→7f

A winding line of a second way of the U phase differs from that of the first way of the U phase by one stator slot in a circumferential direction.

Corresponding adjacent star-point wires in the U phase, the V phase and the W phase differ by four stator slots in the circumferential direction.

Corresponding adjacent lead-out wires in the U phase, the V phase and the W phase differ by four stator slots in the circumferential direction.

According to some embodiments of the disclosure, the U-shaped conductor section has a rectangular span section. A short side of the rectangle is perpendicular to a bottom wall of the stator slot.

According to some embodiments of the disclosure, in an extending direction of the U-shaped conductor sections, the span sectional areas of the U-shaped conductor sections are equal.

By means of the winding method for the stator module according to the embodiment of the disclosure, both a lead-out wire and a star-point wire are disposed on a welding end I, and the welding process is simple. In addition, by means of the winding method according to the embodiments of the disclosure, some stator slots are forwardly wound and then reversely wound, and afterwards, the remaining stator slots are forwardly wound and then reversely wound. The process cycles in this way. Through the wave winding mode, a voltage difference of flat wires between adjacent slot layers in the same slot is smaller than that of the related scheme. The risk of motor insulation breakdown can be effectively reduced. The reliability is high. In addition, there are few types of U-shaped conductor sections required for winding. Therefore, there are few devices for manufacturing the U-shaped conductor sections. The mass production is easily implemented.

According to an embodiment of a second aspect of the disclosure, a stator module is provided. The stator module is wound by using the coil winding method according to the embodiments in the first aspect.

According to a third aspect of the disclosure, a motor is provided. The motor includes the stator module according to the embodiments in the second aspect.

Other aspects and advantages of the present disclosure will be given in the following description, some of which will become apparent from the following description or may be learned from practices of the present disclosure.

BRIEF DESCRIPTION OF THE DRAWINGS

The foregoing and/or additional aspects and advantages of this application will become apparent and comprehensible in the description made with reference to the following accompanying drawings, where.

DRAWING REFERENCE NUMERALS stator module 100, stator core 1, stator slot 11, coil winding 2, U-shaped conductor section 20, bent portion 201, first in-slot portion 202, second in-slot portion 203, first U-shaped conductor section 2001; second U-shaped conductor section 2002; third U-shaped conductor section 2003; fourth U-shaped conductor section 2004; neutral line 3, hair-pin end I, welding end II; three phases: U phase, V phase and W phase U-phase 1-way lead-out wire U1A; U-phase 2-way lead-out wire U2A; U-phase 1-way star-point wire U1A; U-phase 2-way star-point wire U2B; V-phase 1-way lead-out wire V1A; V-phase 2-way lead-out wire V2A; V-phase 1-way star-point wire V1A; V-phase 2-way star-point wire V2B; W-phase 1-way lead-out wire W1A; W-phase 2-way lead-out wire W2A; W-phase 1-way star-point wire W1A; W-phase 2-way star-point wire W2B.

DETAILED DESCRIPTION

The following describes embodiments of the present disclosure in detail. Examples of the embodiments are shown in the accompanying drawings, and same or similar reference signs in all the accompanying drawings indicate same or similar components or components having same or similar functions. The embodiments described below with reference to the accompanying drawings are exemplary, and are intended to explain the present disclosure and cannot be construed as a limitation to the present disclosure.

In the description of the present disclosure, it should be understood that orientation or position relationships indicated by the terms such as "center", "above", "below", "vertical", "horizontal", "top", "bottom", "inside", "outside", "axial", "radial", and "circumferential" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of the present disclosure. In addition, terms "first" and "second" are only used to describe the objective and cannot be understood as indicating or implying relative importance or implying a quantity of the indicated technical features. In view of this, a feature defined to be "first" or "second" may explicitly or implicitly include one or more features. In the description of the present disclosure, unless stated otherwise, the meaning of "a plurality of" is two or more than two.

In the description of the present disclosure, it should be noted that unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. Persons of ordinary skill in the art may understand the specific meanings of the foregoing terms in the present disclosure according to specific situations.

The following first describes a stator module according to an embodiment of a first aspect of the disclosure according to FIGS. 1-4. The stator module may be used as an initial stator module and processed according to customer requirements to obtain a final stator module having different way numbers and in a final form.

A stator module 100 according to an embodiment of the disclosure includes: a stator core 1 and a coil winding 2.

Figure 1:
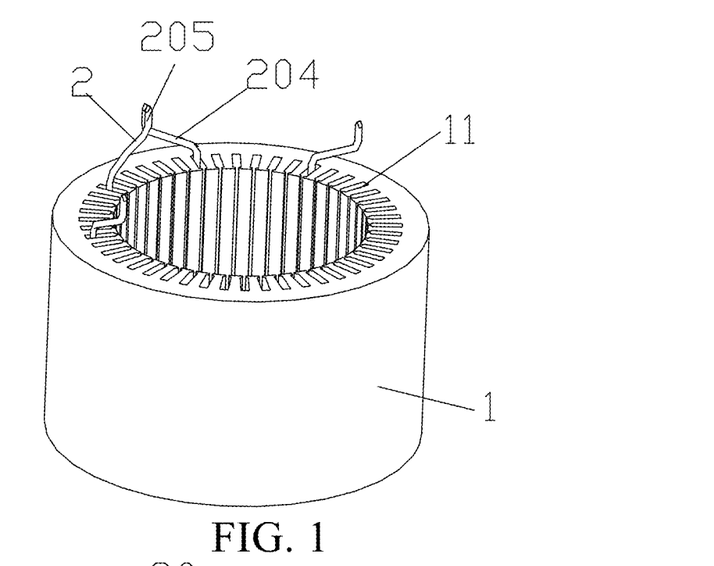
FIG. 1 is a schematic diagram of a stator core in a stator module according to an embodiment of the disclosure.
Figure 2:
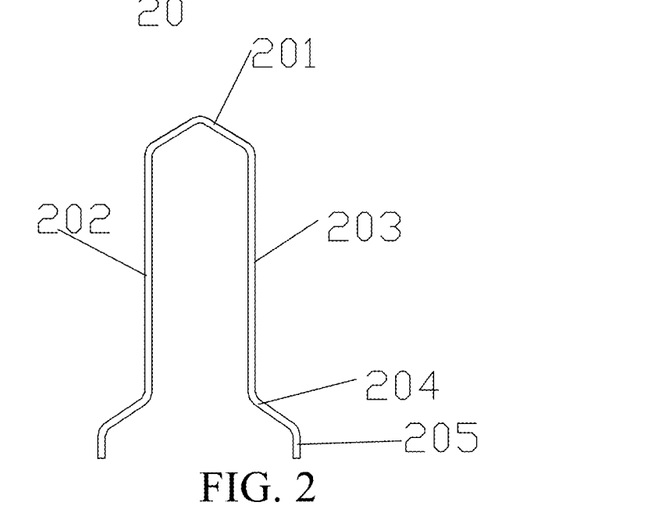
FIG. 2 is a schematic diagram of a U-shaped conductor section in a stator module according to an embodiment of the disclosure.
Figures 3A, 3B:
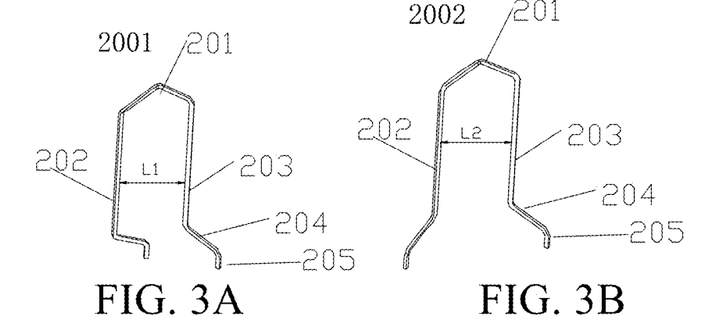
FIGS. 3A-3D are schematic diagrams of first to fourth U-shaped conductor sections adopted during the winding of a stator module according to an embodiment of the disclosure.
Figure 3C:
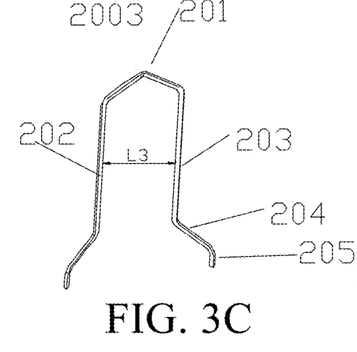
Figure 3D:
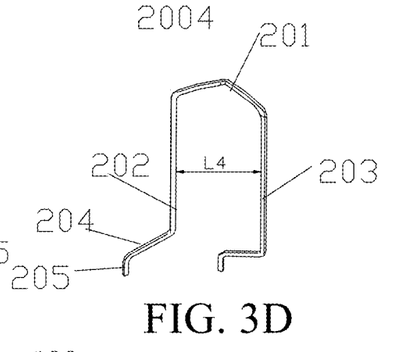

As shown in FIG. 1, the stator core 1 has multiple stator slots 11. Each stator slot 11 is formed with multiple slot layers. Specifically, after a stator winding is inserted into the stator slot 11, the stator slot has multiple layers formed from the stator winding. In some embodiments of the disclosure, the slot layer includes layers a, b, c, d, e, and f arranged in sequence. In each stator slot 11, an innermost layer of the stator core 1 in a radial direction is layer a, and an outermost layer is layer f. The coil winding 2 includes multiple U-shaped conductor sections 20. As shown in FIGS. 2 and 3, each U-shaped conductor section 20 includes a bent portion 201 and a first in-slot portion 202 and a second in-slot portion 203 respectively connected to the bent portion 201. The first in-slot portion 202 passes through one of the slot layers in one of the stator slots 11. The second in-slot portion 203 passes through one of the slot layers in another stator slot 11. End portions of the first in-slot portion 202 and the second in-slot portion 203 extend beyond the stator core 1 after the first in-slot portion and the second in-slot portion pass through the stator slots 11.

The U-shaped conductor section 20 has a rectangular span section perpendicular to an extending direction thereof. Optionally, the U-shaped conductor section 20 has a rectangular span section. A short side of the rectangle is perpendicular to a bottom wall of the stator slot 11. In the extending direction of the U-shaped conductor sections 20, the span sectional areas of the U-shaped conductor sections 20 are equal.

Figure 4:
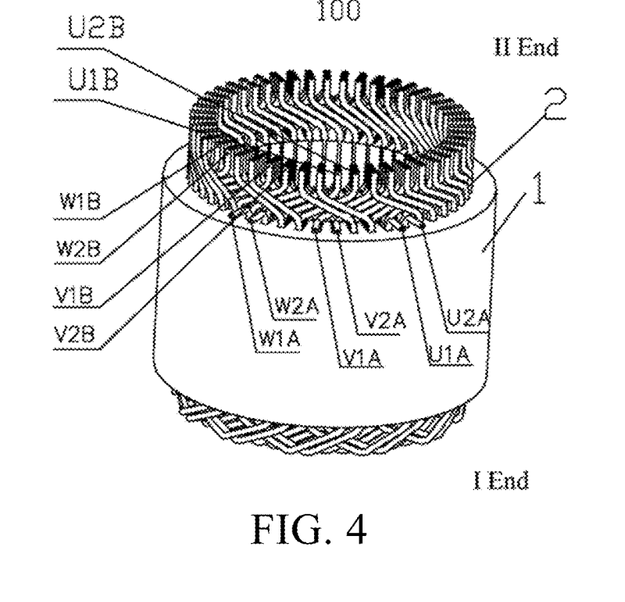
FIG. 4 is a schematic diagram of a stator module as an initial setting according to an embodiment of a first aspect of the disclosure, where 8 poles, 48 slots and 3 phases are taken as an example.

As shown in FIG. 4, an end where the bent portion 201 in the multiple U-shaped conductor sections 20 is located is a hair-pin end I of the coil winding 2, and an end where the end portions of the first in-slot portion 202 and the second in-slot portion 203 are located is called a welding end II of the coil winding 2. As shown in FIG. 3, the welding end 2 is formed by welding the first in-slot portions 202 of the multiple U-shaped conductor sections 20 and the second in-slot portions 203 of the adjacent U-shaped conductor sections 20 in sequence.

On the welding end II, star-point wires and lead-out wires of each phase and each way differ by 3q stator slots 11 in a circumferential direction, star-point wires of each phase and multiple ways differ by one stator slot 11 between two adjacent phases in the circumferential direction, and lead-out wires of each phase and multiple ways differ by one stator slot 11 between two adjacent phases in the circumferential direction.

Corresponding star-point wires between multiple phases differ by 2q stator slots 11 in the circumferential direction.

Corresponding lead-out wires between multiple phases differ by 2q stator slots 11 in the circumferential direction.

The number of slots per pole and phase is $q=z/m/(2p)$, and the number of parallel branches is g, where $g \leq q$, z is a stator slot number, m is a phase number, and 2p is a pole number.

The stator module 100 here is applicable to a motor having z slots, 2p poles, and m phases. The slot number z here may be 24, 48, 72, etc. The phase number m may be three-phase, two-phase, or single-phase. The pole pair number p may be 8, 4, etc. They may be set according to a specific applicable motor.

What needs to be explained here is that "differ" refers to a difference between two slot numbers. For example, if an initial slot is 1, there is a seventh slot after a difference of six slots.

The foregoing winding coil structure may be wound by the following winding method.

In S1, multiple U-shaped conductor sections 20 are provided. Each of the U-shaped conductor sections 20 includes a bent portion and a first in-slot portion 202 and a second in-slot portion 203 respectively connected to the bent portion. Pitches between the first in-slot portion 202 and the second in-slot portion 203 are all y stator slots 11, where y is an integer and $y=z/2p$.

In S2, the first in-slot portion 202 of the U-shaped conductor section 20 passes through one of the slot layers in one of the stator slots 11, and the second in-slot portion 203 passes through one of the slot layers in another stator slot 11. End portions of the first in-slot portion 202 and the second in-slot portion 203 extend beyond the stator core to form a welding end after the first in-slot portion and the second in-slot portion pass through the stator slots 11.

In S3, the first in-slot portion 202 and the second in-slot portion 203 in different layers of the multiple U-shaped conductor sections 20 are welded and connected to the welding end, such that a coil winding direction is configured in each phase and each way:

In S31, a lead-out wire is led out to a radially outermost slot layer of an initial slot. The initial slot is the stator slot 11 into which the lead-out wire is inserted for the first time when being ready to be wound.

In S32, y stator slots 11 are spanned on the same layer along a first direction.

In S33, spanning is performed along a second direction by starting from a radially second outermost slot layer that spans the y stator slots 11. The number of layers of the slot layer changes by one every time the y stator slots are spanned. The number of layers changes radially from outside to inside till a radially second innermost slot layer.

In S34, y stator slots 11 are spanned on the same layer along the first direction by starting from a radially innermost slot layer that spans the y stator slots.

In S35, spanning is performed along the first direction by starting from the radially second innermost slot layer that spans the y stator slots. The number of layers of the slot layer changes by one every time the y stator slots are spanned. The number of layers changes radially from inside to outside till the radially second outermost slot layer.

In S36, y stator slots are spanned on the same layer along the first direction by starting from the radially outermost slot layer that spans the y stator slots; and In S37, S33-S36 are repeated until the winding reaches an adjacent layer of the radially outermost slot layer of a termination slot and then a star point wire of this phase and this way is led out. The termination slot is spaced from the initial slot by y stator slots in a forward direction. The term "termination slot" here refers to the last stator slot that is bypassed after the coil is completely wound.

The first direction and the second direction are opposite directions along the circumference of the stator core.

By means of the winding method for the stator module according to the embodiment of the disclosure, both a lead-out wire and a star-point wire are disposed on a welding end I. Compared with a conventional coil in which both a welding end and a hair-pin end have a welding point, the welding process is simple. In addition, different from the form of wave-winding from an outermost layer to an innermost layer and then reversely wave-winding to the outermost layer in the related art, the winding method according to the embodiments of the disclosure adopts a form that some stator slots are forwardly wound and then reversely wound, and afterwards, the remaining stator slots are forwardly wound and then reversely wound. The process cycles in this way. Through the wave winding mode, a voltage difference of flat wires between adjacent slot layers in the same slot is smaller than that of the related scheme. The risk of motor insulation breakdown can be effectively reduced. The reliability is high.

According to an embodiment of the disclosure, the U-shaped conductor section 20 includes at least: multiple first U-shaped conductor sections 2001, multiple second U-shaped conductor sections 2002, multiple third U-shaped conductor sections 2003, and multiple fourth U-shaped conductor sections 2004. The first U-shaped conductor sections 2001 are used for spanning on the same layer in step S32. The second U-shaped conductor sections 20 are used for spanning inwards radially by one layer from a radial outer layer when spanning in a second winding direction in step S33. The third U-shaped conductor sections 20 are used for spanning outwards radially by one layer from a radial inner layer when spanning in a first winding direction in step S35. The fourth U-shaped conductor sections 20 are used for spanning on the same layer in step S34. In other words, the first U-shaped conductor section 2001 is used for spanning from the same layer between radially outermost layers, and the fourth U-shaped conductor section 2004 is used for spanning from the same layer between radially innermost layers. The second U-shaped conductor section 2002 is adopted when spanning for one layer from outside to inside, that is, forwardly spanning for one layer. The third U-shaped conductor section 2003 is adopted when spanning for one layer from inside to outside, that is, reversely spanning for one layer.

More specifically, during coil winding, in each phase and each way, the lead-out wire is connected, on the welding end, to the first in-slot portion of a first U-shaped conductor section 2001 located at the radially outermost slot layer. The first U-shaped conductor section 2001 spans y stator slots on the same layer along a reverse direction. Multiple second U-shaped conductor sections 2002 span along a forward direction and are connected in sequence. Each second U-shaped conductor section 2002 spans y stator slots. Each second U-shaped conductor section 2002 has a slot layer where the second in-slot portion is located radially inward than a slot layer where the first in-slot portion is located by one layer until the second in-slot portion is located in a radial second-inner slot layer. A third U-shaped conductor section 2003 spans y stator slots on the same layer along the reverse direction. Multiple fourth U-shaped conductor sections 2004 span along the reverse direction and are connected in sequence. Each fourth U-shaped conductor section 2004 spans y stator slots. Each fourth U-shaped conductor section 2004 has a slot layer where the second in-slot portion is located radially outward than a slot layer where the first in-slot portion is located by one layer until the second in-slot portion is located in a radial second-outer slot layer. Then the first U-shaped conductor section 2001, the second U-shaped conductor section 2002, the third U-shaped conductor section 2003 and the fourth U-shaped conductor section 2004 are adopted to repeat the above setting until the second in-slot portion of a certain fourth U-shaped conductor section 2004 reaches an adjacent layer of the radially outermost slot layer of the termination slot and connects a star-point wire of this phase and this way. The termination slot is spaced from the initial slot by y stator slots in a forward direction.

As shown in FIG. 2 to FIG. 3D, a connecting leg and a welding leg are connected to an end of any one of the first in-slot portion 202 and the second in-slot portion 203 of the U-shaped conductor section 20 respectively. The connecting leg is bent with respect to the corresponding in-slot portion. Specifically, as shown in FIG. 3A and FIG. 3D, the connecting legs 204 of the first in-slot portion 202 and the second in-slot portion 203 in the first U-shaped conductor section 20 are bent in the same direction. The connecting legs 204 of the first in-slot portion 202 and the second in-slot portion 203 in the fourth U-shaped conductor section 20 are bent in the same direction. The first U-shaped conductor section 20 and the fourth U-shaped conductor section 20 are of substantially the same shape and the connecting legs 204 are bent in opposite directions. However, due to different widths of the stator slots at different radial positions, the first U-shaped conductor section 2001 and the fourth U-shaped conductor section 2004 have different spanning sizes. That is, a distance L1 between two legs 202 and 203 of the first U-shaped conductor section 2001 and a distance L4 between two legs 202 and 203 of the fourth U-shaped conductor section 2004 are different. More specifically, L1>L4.

As shown in FIG. 3B and FIG. 3C, the connecting legs 204 of the first in-slot portion 202 and the second in-slot portion 203 of the second U-shaped conductor section 2002 are bent in opposite directions. The second U-shaped conductor section 2002 and the third U-shaped conductor section 2003 are of substantially the same shape and have an identical span (six stator slots). Those skilled in the art should easily understand that two legs of the second U-shaped conductor section 2002 spanning forwardly and the third U-shaped conductor section 2003 spanning reversely between two adjacent slot layers are required to have exactly the same size. For example, a distance L2 between the two legs 202 and 203 of the second U-shaped conductor section 2002 when spanning from a second layer to a third layer from the radially outer side is equal to a distance L3 between the two legs 202 and 203 of the third U-shaped conductor section 2003 when spanning from the third layer to the second layer. Of course, it can also be understood that due to different widths of the stator slots at different radial positions, a distance L2 between the two legs 202 and 203 of multiple second U-shaped conductor sections 2002 spanning forwardly between different slot layers should also be different. For example, a distance L2 between the two legs 202 and 203 of the second U-shaped conductor section 2002 when spanning from a second layer to a third layer from the radially outer side is different from a distance L2' between the two legs 202 and 203 of the second U-shaped conductor section 2002 when spanning from the third layer to a fourth layer. More precisely, L2' is less than L2.

Optionally, the first in-slot portion 202 and the second in-slot portion 203 of the second U-shaped conductor section 20 are located on different surfaces. Similarly, the first in-slot portion 202 and the second in-slot portion 203 of the third U-shaped conductor section 2003 are also located on different surfaces.

According to the winding method of the embodiment of the disclosure, there are few types of U-shaped conductor sections required for winding. Therefore, there are few devices for manufacturing the U-shaped conductor sections. The mass production is easily implemented.

In addition, according to the winding method of the embodiment of the disclosure, the distance between a lead-out wire and a star-point wire is minimized, which may be used as the structure of an initial stator module, for example, structural factory settings. The number of parallel branches of the winding may be adjusted respectively for customer requirements. In this way, on the basis of the stator module, if a user needs 1-way access, the stator module of the embodiment of the disclosure may be processed to be adjusted to a stator module with one way of parallel branches, and then assembled with components such as a rotor to obtain a one-way access motor. Correspondingly, if the user needs 2-way access, the stator module of the embodiment of the disclosure may be processed to be adjusted to a stator module with two ways of parallel branches.

The following will describe, in detail, a processing method for adjusting different way numbers of the foregoing stator module 100 according to user requirements.

The processing method includes the following steps.

In S1, a way number g is selected, where g is a natural number greater than or equal to 1.

When q is an odd number, g has two options: q and 1.

When q is even, g has q/2+1 options: q, q/2, q/4, . . . , 1.

In S2, when the way number g=q is selected, star-point wires of each way in phase m are bent outward and connected through a neutral line 3. Lead-out wires of each way in phase m are welded and fixed and then are connected to an external controller interface. Optionally, the material in the neutral line 3 here may be the same as that of the U-shaped conductor section 20.

In S3, when the way number g=1 is selected, after the lead-out wire of a $k^{th}$ way in each phase is stretched and bent outward, the star-point wires of a $(k-1)^{th}$ way in the corresponding phase are welded and fixed in sequence, where k is a natural number of 2-q. The lead-out wires of the first way in each phase are welded and fixed and then are connected to the external controller interface. The star-point wires of other ways except the first way in each phase are bent outward and connected through the neutral line 3.

At this time, for the sake of clarity, a 4-way U-phase winding is taken as an example. If it is required to be changed into one way, the following manners may be adopted. A U-phase 4-way lead-out wire is stretched and bent and then is connected to a U-phase 3-way star-point wire. A U-phase 3-way lead-out wire is stretched and bent and then is connected to a U-phase 2-way star-point wire. A U-phase 2-way lead-out wire is stretched and bent and then is connected to a U-phase 1-way star-point wire. A U-phase 1-way lead-out wire is welded and fixed and then is connected to an external controller. In addition, U-phase 4-way star-point wires are connected through the neutral line 3.

In S4, when q is an even number, q ways in each phase are divided into q/2 groups. The lead-out wires of one way in at least one of the q/2 groups are bent and then welded and fixed with the star-point wires of another way. The star-point wires of one way are bent outward and connected through the neutral line 3. The lead-out wires of another way are fixed and then connected to the external controller interface.

For the sake of clarity, the 4-way U-phase is still taken as an example. If it is required to be changed into two ways, the following manners may be adopted. Four ways in the U phase are divided into two groups. The first and second ways are in the first group, and the third and fourth ways are in the second group. The lead-out wires of the second way are welded and fixed with the star-point wires of the first way. The star-point wires of the second way are connected to the neutral line 3. The first way is connected to an external controller. The lead-out wires of the fourth way are welded and fixed with the star-point wires of the third way. The star-point wires of the fourth way are connected to the neutral line 3. The third way is connected to the external controller. Thus, two ways are finally formed.

The processing method according to the embodiment of the disclosure makes the number of winding ways of the stator module adjustable in a simple and fast adjustment mode. Moreover, the vehicle requirements of different motor voltage levels may be matched, and the vehicle requirements of different high-efficiency zones may also be matched. In addition, the way number may be adjusted to be different, the voltage difference between adjacent layers in each stator slot is different, and the requirements for a layer insulation system are different. Therefore, different way number schemes may be selected according to actual risks and cost control.

The stator module, the winding method and the processing method for adjusting a way number will be described by taking the application of the stator module according to the embodiment of the disclosure to a motor having 8 poles, 48 slots and 3 phases as an example. That is, a stator slot number z is 48, and a phase number m is 3. The three phases include U phase, V phase and W phase. A pole number 2p is 8 (that is, a pole pair number is 4), and each of the three phases includes two ways.

As shown in FIG. 4, in the coil winding 2 of the stator module 100, pitches between the first in-slot portion 202 and the second in-slot portion 203 of the U-shaped conductor section 20 are all y stator slots, where y is an integer and y=z/2p. For an 8-pole 48-slot stator module 100, y=6. That is, there is a difference of six stator slots between the first in-slot portion 202 and the second in-slot portion 203 of each U-shaped conductor section 20.

In the following description, the disclosure will be described by taking six layers in each stator slot 11 as an example. The six slot layers include layers a, b, c, d, e, and f arranged in sequence. In each stator slot 11, an innermost layer in a radial direction of the stator core 1 is layer a, and an outermost layer is layer f.

In the stator module as shown in FIG. 4, the star-point wire and the lead-out wire of each way of the U phase differ by six stator slots 11. The star-point wires or the lead-out wires of two ways of each phase differ by one stator slot 11 in a circumferential direction. The corresponding adjacent star-point wires in the U phase, the V phase and the W phase differ by four stator slots 11 in the circumferential direction. The corresponding adjacent lead-out wires in the U phase, the V phase and the W phase differ by four stator slots 11 in the circumferential direction.

Figure 5:
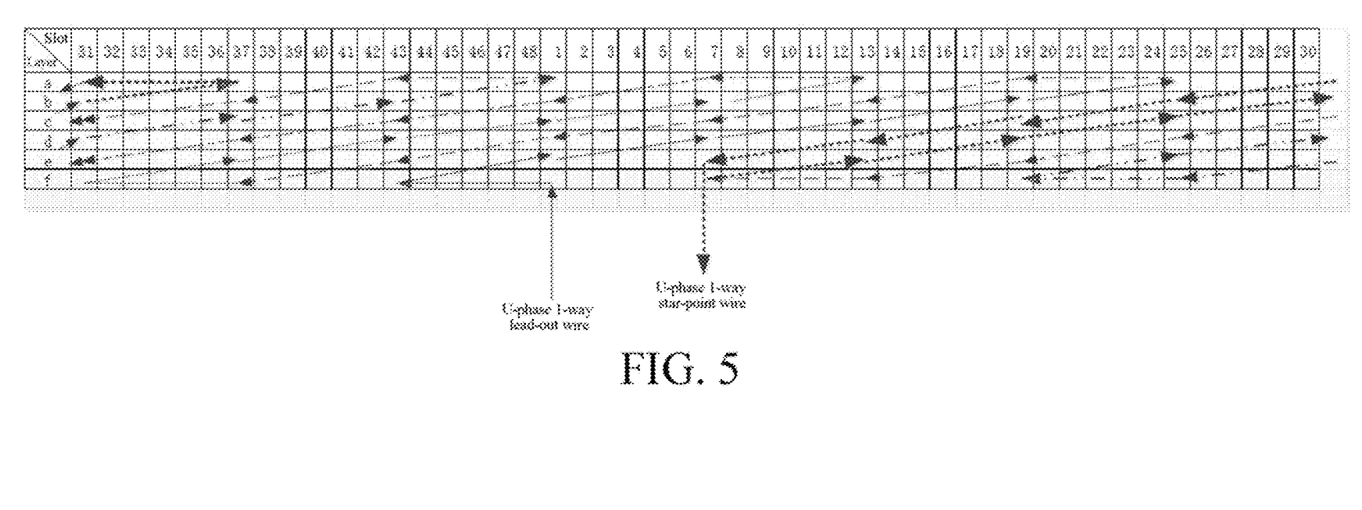
FIG. 5 is a schematic diagram of a winding mode of the stator module in FIG. 4, where U-phase 1-way is taken as an example.
Figure 6:
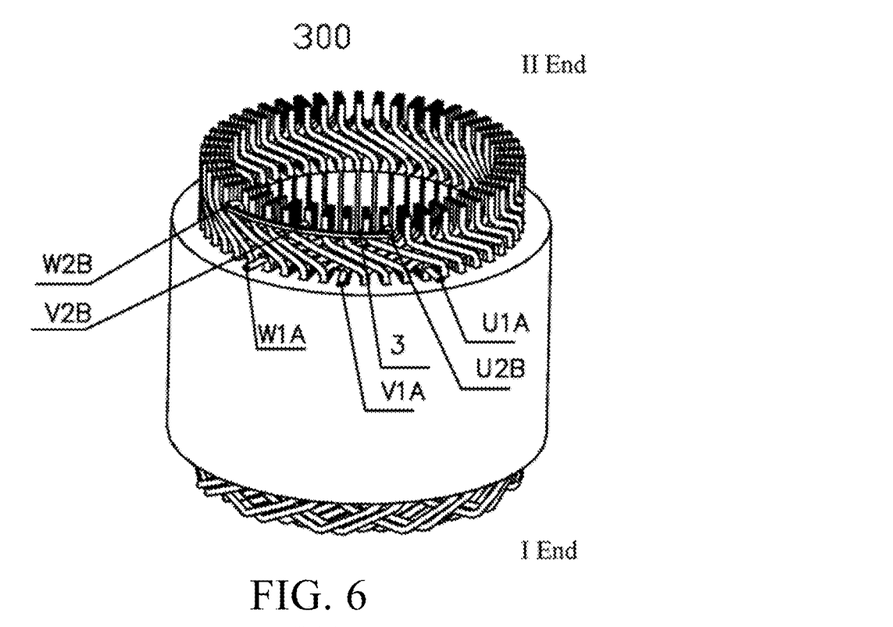
FIG. 6 is a final stator module in a 2-way wiring mode formed by processing the stator module in FIG. 4.

More specifically, as shown in FIG. 5 and FIG. 6, a U-phase 1-way lead-out wire U1A and a U-phase 2-way lead-out wire U2A differ by one stator slot. A V-phase 1-way lead-out wire V1A and a V-phase 2-way lead-out wire V2A differ by one stator slot. A W-phase 1-way lead-out wire W1A and a W-phase 2-way lead-out wire W2A differ by one stator slot.

As shown in FIG. 5 and FIG. 6, the U-phase 1-way lead-out wire U1A and a U-phase 2-way star-point wire U1B differ by six stator slots, and the U-phase 2-way lead-out wire U2A and a U-phase 2-way star-point wire U2B differ by six stator slots. Similarly, the V-phase 2-way lead-out wire V1A and star-point wire V1B and the V-phase 2-way lead-out wire V2A and star-point wire V2B also differ by six stator slots. The W-phase 2-way lead-out wire W1A and star-point wire W1B and the W-phase 2-way lead-out wire W2A and star-point wire W2B also differ by six stator slots.

The corresponding adjacent star-point wires in the U phase, the V phase and the W phase differ by four stator slots in the circumferential direction. Specifically, the first way is taken as an example. The U-phase 1-way star-point wire U1B, the V-phase 1-way star-point wire V1B and the W-phase 1-way star-point wire W1B differ by four stator slots in the circumferential direction in sequence. For example, as shown in FIG. 2, U1B is led out from layer e of slot 07, V1B is led out from layer e of slot 03, and W1B is led out from layer e of slot 47. Similarly, U2B, V2B and W2B of the second way are led out from layer e of slot 08, layer e of slot 04, and layer e of slot 48, respectively, and there are differences of four stator slots in sequence.

Correspondingly, the corresponding adjacent lead-out wires in the U phase, the V phase and the W phase differ by four stator slots 11 in the circumferential direction. Specifically, the first way is taken as an example. The U-phase 1-way lead-out wire U1A, the V-phase 1-way lead-out wire V1A and the W-phase 1-way lead-out wire W1A differ by four stator slots in the circumferential direction in sequence. For example, as shown in FIG. 2, U1A is introduced from layer f of slot 01, V1A is introduced from layer f of slot 45, and W1A is introduced from layer f of slot 41. Similarly, U2A, V2A and W2A of the second way are introduced from layer f of slot 02, layer f of slot 46, and layer f of slot 42, respectively, and there are differences of four stator slots in sequence.

The foregoing winding coil structure may be wound by the following winding method. As shown in FIG. 5 and FIG. 6, the first way of the U phase is taken as an example. A winding route is as follows:

1f→43f→1e→7d→13c→19b→25a→19a
13b→7c→d→43
e→37f→31f→37e→43d→1c→7b→13a→7a→1b→43c→37d→31
e→25f→19f→25e→31d→37c→43b→1a→43a→37b→31c→25d→19e→13f→7f→13e→19d→25c→31b→37a→31a→25b→19c→13d→→7e

A winding line of a second way of the U phase differs from that of the first way of the U phase by one stator slot in a circumferential direction.

Corresponding adjacent star-point wires in the U phase, the V phase and the W phase differ by four stator slots between two adjacent phases in the circumferential direction.

Corresponding adjacent lead-out wires in the U phase, the V phase and the W phase differ by four stator slots between two adjacent phases in the circumferential direction.

When winding by the foregoing coil winding method, multiple first U-shaped conductor sections, multiple second U-shaped conductor section 2002, multiple third U-shaped conductor sections 2003, and multiple fourth U-shaped conductor sections 2004 are adopted. The first way of the U phase is still taken as an example. Referring to FIG. 5 and the foregoing winding route, the winding situation is as follows.

The lead-out wire U1A is introduced into a radially outermost slot layer 1f of the first slot of the initial slot on the welding end, and is connected to the first in-slot portion of the first U-shaped conductor section 2001. The first U-shaped conductor section 2001 spans six stator slots on the same layer along a reverse direction and reaches 43f.

Multiple second U-shaped conductor sections 2002 span along the second direction and are connected in sequence. Each second U-shaped conductor section 2002 spans six stator slots. Each second U-shaped conductor section 2002 has a slot layer where the second in-slot portion is located radially inward than a slot layer where the first in-slot portion is located by one layer until the second in-slot portion is located in a radial second-inner slot layer. That is, the first second U-shaped conductor section 2002 spans from 1e to 7d, the first in-slot portion is located in 1e, the welding end is connected to the welding end of the second in-slot portion of the first U-shaped conductor section 2001 at 43f, and the second in-slot portion is located in 7d. The next second U-shaped conductor section 2002 spans from 13c to 19b, the first in-slot portion is located in 13c, the welding end is connected to the welding end of the second in-slot portion in 7d, and the second in-slot portion is located in 19b.

A third U-shaped conductor section 2003 spans six stator slots on the same layer along the first direction from a radially innermost slot layer 25a that spans six stator slots, and reaches 19a. That is, the first in-slot portion of the third U-shaped conductor section 2003 is located in 25a, the welding end is connected to the welding end of the second in-slot portion of the second U-shaped conductor section 2002 in 19b, and the second in-slot portion of the third U-shaped conductor section 2003 is located in 19a.

Multiple fourth U-shaped conductor sections 2004 span along the first direction and are connected in sequence. Each fourth U-shaped conductor section 2004 spans six stator slots. Each fourth U-shaped conductor section 2004 has a slot layer where the second in-slot portion is located radially outward than a slot layer where the first in-slot portion is located by one layer until the second in-slot portion is located in a radial second-outer slot layer. That is, the first fourth U-shaped conductor section 2004 spans from 13b to 7c, the first in-slot portion is located in 13b, the welding end is connected to the welding end of the second in-slot portion of the third U-shaped conductor section 2003 in 19a, and the second in-slot portion is located in 7cd. The next fourth U-shaped conductor section 2004 spans from 1d to 43e, the first in-slot portion is located in 1d, the welding end is connected to the welding end of the second in-slot portion in 7c, and the second in-slot portion is located in the radial second-outer slot layer 43e.

A first U-shaped conductor section 2001 spans six stator slots on the same layer along the first direction from a radially outermost slot layer 37f that spans six stator slots, and reaches 31f. That is, the first in-slot portion of the first U-shaped conductor section 2001 is located in 37f, the welding end is connected to the welding end of the second in-slot portion of the fourth conductor section 2004 in 43e, and the second in-slot portion is located in 31f.

Then the second U-shaped conductor section 2002, the third U-shaped conductor section 2003, the fourth U-shaped conductor section 2004 and the first U-shaped conductor section 2001 are adopted to repeat the above setting until the second in-slot portion of a certain fourth U-shaped conductor section 2004 reaches an adjacent layer (that is, second-outer slot layer 7e) of a radially outermost slot layer of a seventh slot of the termination slot and connects a star-point wire U1B of this phase and this way. The seventh slot of the termination slot is spaced from the initial slot by six stator slots in the second direction.

In some embodiments, for a stator module applicable to a motor having 8 poles, 48 slots and 3 phases, on the basis of an initial stator module 100, it may be selected to be processed into a two-way scheme or a one-way scheme.

Figure 7:
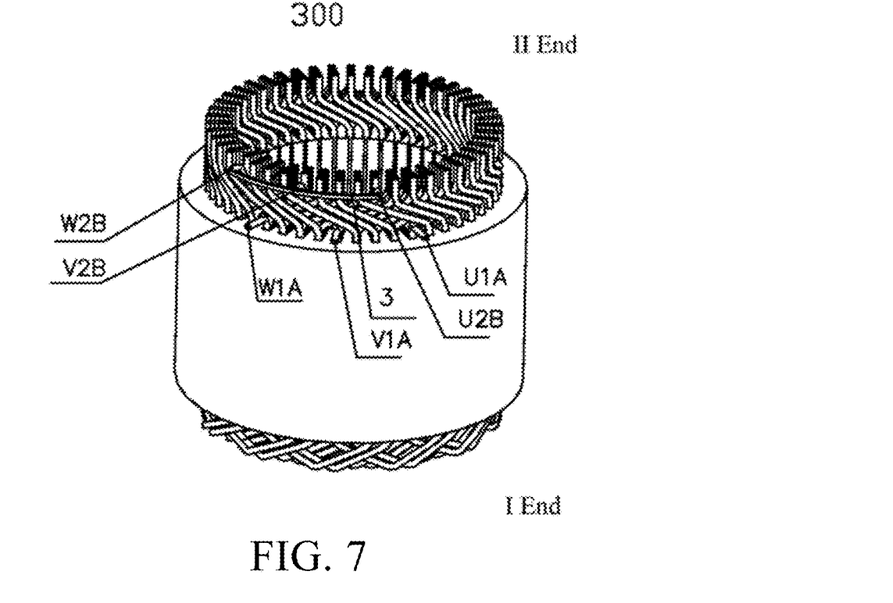
FIG. 7 is a final stator module in a 1-way wiring mode formed by processing the stator module in FIG. 4.

When a user chooses the two-way scheme, the first way of star-point wires U1B, V1B and W1B and the second way of star-point wires U2B, V2B and W2B of the three phases of U, V and W are respectively bent outward, and are welded and connected by a neutral line 3. As shown in FIG. 7, finally, the first way of lead-out wires U1A, V1A and W1A and the second way of lead-out wires U2A, V2A and W2A of the three phases of U, V and W are welded and fixed by welding terminals and then connected to an external controller interface.

When the user chooses the one-way scheme, the second way of lead-out wires U2A, V2A and W2A of the three phases of U, V and W are stretched and bent, and then respectively welded and fixed with the first way of star-point wires U1B, V1B and W1B of the three phases of U, V and W. The second way of star-point wires U2B, V2B and W2B are respectively bent outward, and welded by the neutral line 3. Finally, the first way of lead-out wires U1A, V1A and W1A are welded and fixed by welding terminals and then connected to the external controller interface.

Of course, in the case of different stator slot numbers, pole numbers and phase numbers, the winding structures of each phase and each way are also different.

For example, the stator slot number is 72, the pole number is 8, the phase number is 3, a U phase, a V phase and a W phase are included, and each phase includes three ways (not shown). The star-point wire and the lead-out wire of each way of the U phase differ by nine stator slots 11. The three ways of the U phase differ by one stator slot 11 between two adjacent phases in the circumferential direction. The three ways of the V phase differ by one stator slot 11 between two adjacent phases in the circumferential direction. The three ways of the W phase differ by one stator slot 11 between two adjacent phases in the circumferential direction. The star-point wires corresponding to the U phase, the V phase and the W phase differ by six stator slots 11 in the circumferential direction. The lead-out wires corresponding to the U phase, the V phase and the W phase differ by six stator slots 11 in the circumferential direction.

It is worth noting that in some embodiments, on the welding end II of the coil winding, the star-point wire of any phase and each way is located on the radially outermost layer, and the lead-out wire of any phase and each way is located on the radial second-outer layer, which is convenient for the introduction of the lead-out wire and the lead-out of the star-point wire. The entire coil winding structure is simple.

Based on the foregoing, the stator module 100 according to the embodiment of the disclosure has only welding points on the welding end and no welding terminals on the hair-pin end. The welding process is simple and convenient. Fewer types of coils and devices are required for winding. The mass production is easily implemented. In addition, by adopting such a winding method, a voltage difference of flat wires between adjacent slot layers in the same slot is smaller than that of the related scheme. The risk of motor insulation breakdown can be effectively reduced. The reliability is high. In addition, the number of winding ways is easily adjusted.

Figure 8:
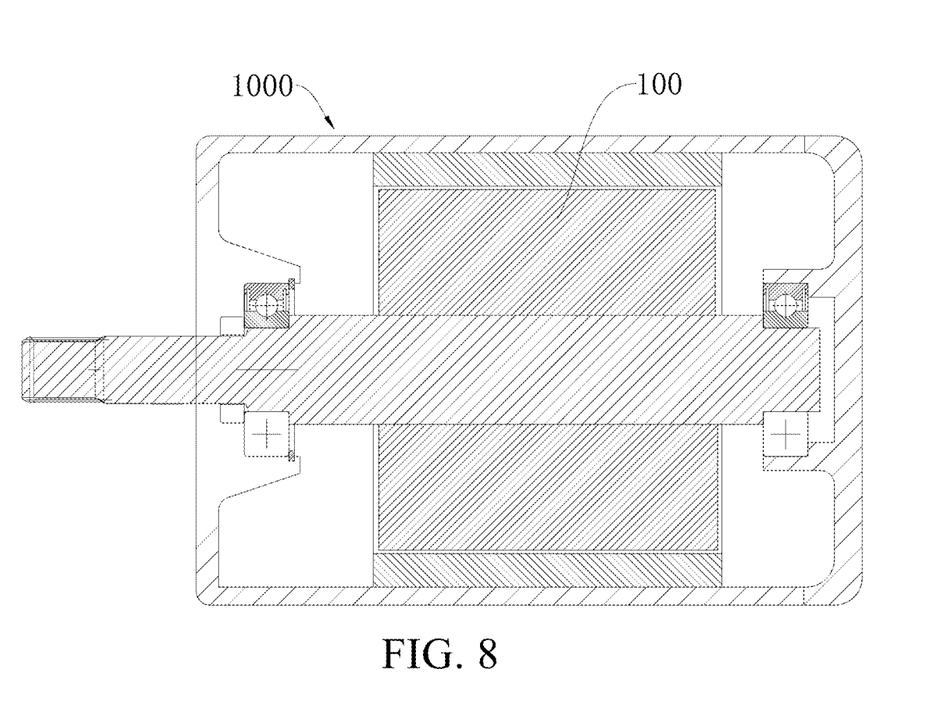
FIG. 8 is a schematic diagram of a motor according to an embodiment of the disclosure.

Referring to FIG. 8, according to a second aspect of the disclosure, a motor 100 is provided. The motor includes the stator module 100 according to the first aspect of the disclosure. The motor 1000 shown in FIG. 8 may include the stator module 100. The stator module may be the stator module described in the embodiments of FIG. 1 to FIG. 7. To avoid repetition, details are not repeated here.

The motor according to the embodiment of the second aspect of the disclosure is provided with the stator module according to the embodiment of the first aspect of the disclosure, thereby improving the overall performance of the motor.

In the descriptions of this specification, descriptions using reference terms "an embodiment", "some embodiments", "an exemplary embodiment", "an example", "a specific example", or "some examples" mean that specific characteristics, structures, materials, or features described with reference to the embodiment or example are included in at least one embodiment or example of the present disclosure. In this specification, schematic descriptions of the foregoing terms do not necessarily directed at a same embodiment or example. Moreover, the specific features, structures, materials, or characteristics described may be combined in any one or more embodiments or examples in an appropriate manner.

Although the embodiments of the present disclosure have been shown and described, persons of ordinary skill in the art should understand that various changes, modifications, replacements and variations may be made to the embodiments without departing from the principles and spirit of the present disclosure, and the scope of the present disclosure is as defined by the appended claims and their equivalents.

What is claimed is:

1. A winding method for a winding of a stator module for a motor having z slots, 2p poles, and m phases, a number of slots per pole and phase being q=z/m/(2p), a number of parallel branches being a, a≤q, the stator module comprising a stator core having a plurality of stator slots, and each of the stator slots having a plurality of slot layers, the winding method comprising:

S1: providing a plurality of U-shaped conductor sections, each of the U-shaped conductor sections comprising a bent portion and a first in-slot portion and a second in-slot portion respectively connected to the bent portion, and pitches between the first in-slot portion and the second in-slot portion being all y stator slots, where y is an integer and y=z/2p;

S2: enabling the first in-slot portion of the U-shaped conductor section to pass through one of the slot layers in one of the stator slots and the second in-slot portion to pass through one of the slot layers in another stator slot, end portions of the first in-slot portion and the second in-slot portion extending beyond the stator core to form a welding end after the first in-slot portion and the second in-slot portion pass through the stator slots;

S3: welding and connecting the first in-slot portion and the second in-slot portion in different layers of the plurality of U-shaped conductor sections to the welding end, such that a winding direction of the winding is configured in each phase and each way:

S31: leading out a lead-out wire to a radially outermost slot layer of an initial slot;

S32: spanning y stator slots on the same layer along a first direction;

S33: spanning along a second direction by starting from a radially second outermost slot layer that spans the y stator slots, the number of layers of the slot layer changing by one every time the y stator slots are spanned, the number of layers changing radially from outside to inside till a radially second innermost slot layer;

S34: spanning y stator slots on the same layer along the first direction by starting from a radially innermost slot layer that spans the y stator slots;

S35: spanning along the first direction by starting from the radially second innermost slot layer that spans the y stator slots, the number of layers of the slot layer changing by one every time the y stator slots are spanned, the number of layers changing radially from inside to outside till the radially second outermost slot layer;

S36: spanning y stator slots on the same layer along the first direction by starting from the radially outermost slot layer that spans the y stator slots; and S37: repeating S33-S36 until the winding reaches an adjacent layer of the radially outermost slot layer of a termination slot and then a star point wire of this phase and this way is led out, the termination slot being spaced from the initial slot by y stator slots in a forward direction, wherein the first direction and the second direction are opposite directions along the circumference of the stator core.

2. The winding method for the winding of the stator module according to claim 1, wherein the number of layers of the slot layer in each of the stator slots is an even number.

3. The winding method for the winding of the stator module according to claim 1, wherein lead-out wires of the same phase and respective ways differ by one stator slot between two adjacent phases in a circumferential direction.

4. The winding method for the winding of the stator module according to claim 1, wherein star-point wires of respective phases and each way differ by 2q slots between two adjacent phases in the circumferential direction, and lead-out wires of respective phases and each way differ by 2q slots between two adjacent phases in the circumferential direction.

5. The winding method for the winding of the stator module according to claim 1, wherein the U-shaped conductor section at least comprises:

a plurality of first U-shaped conductor sections, the first U-shaped conductor sections being used for spanning on the same layer in step S32;

a plurality of second U-shaped conductor sections, the second U-shaped conductor sections being used for spanning inwards radially by one layer from a radial outer layer when spanning in a second winding direction in step S33;

a plurality of third U-shaped conductor sections, the third U-shaped conductor sections being used for spanning outwards radially by one layer from a radial inner layer when spanning in a first winding direction in step S35; and a plurality of fourth U-shaped conductor sections, the fourth U-shaped conductor sections being used for spanning on the same layer in step S34.

6. The winding method for the winding of the stator module according to claim 5, wherein a connecting leg and a welding leg are connected to an end of any one of the first in-slot portion and the second in-slot portion of the U-shaped conductor section respectively, the connecting leg being bent with respect to the corresponding in-slot portion.

7. The winding method for the winding of the stator module according to claim 6, wherein the connecting legs of the first in-slot portion and the second in-slot portion in the first U-shaped conductor section are bent in the same direction;

the connecting legs of the first in-slot portion and the second in-slot portion in the fourth U-shaped conductor section are bent in the same direction; and the connecting legs of the first U-shaped conductor section and the fourth U-shaped conductor section are bent in opposite directions.

8. The winding method for the winding of the stator module according to claim 6, wherein the connecting legs of the first in-slot portion and the second in-slot portion of the second U-shaped conductor section are bent in opposite directions, and the second U-shaped conductor section and the third U-shaped conductor section are of the same shape.

9. The winding method for the winding of the stator module according to claim 1, wherein the stator module is applicable to the motor having a slot number z of 48, a pole pair number p of 4, a phase number of 3, and a pitch y of 6.

10. The winding method for the winding of the stator module according to claim 9, wherein each of the 48 stator slots has six slot layers a, b, c, d, e, and f, three phases comprise a U phase, a V phase and a W phase, and the number a of ways per phase is 2, a winding route of a first way of the U phase of a stator being as follows:

1f→43f→1e→7d→13c→19b→25a→19a→13b→7c→
1d→43e→37f→31f→37e→43d→1c→7b→13a→
7a→1b→43c→37d→31e→25f→19f→25e→31d→
37c→43b→1a→43a→37b→31c→25d→19e→13
f→7f→13e→19d→25c→31b→37a→31a→25b→
19c→13d→7e a winding line of a second way of the U phase differs from that of the first way of the U phase by one stator slot in a circumferential direction;

corresponding adjacent star-point wires in the U phase, the V phase and the W phase differ by four stator slots in the circumferential direction; and corresponding adjacent lead-out wires in the U phase, the V phase and the W phase differ by four stator slots in the circumferential direction.

11. The winding method for the winding of the stator module according to claim 1, wherein the U-shaped conductor section has a rectangular span section, a short side of the rectangle being perpendicular to a bottom wall of the stator slot.

12. The winding method for the winding of the stator module according to claim 11, wherein in an extending direction of the U-shaped conductor sections, the span sectional areas of the U-shaped conductor sections are equal.

13. A stator module, wound by using the winding method for a winding according to claim 1.

14. A motor, comprising the stator module according to claim 13.

* * * * *